United States Patent [19]

Kawakami et al.

[11] Patent Number: 5,702,845
[45] Date of Patent: Dec. 30, 1997

[54] SECONDARY BATTERY USING LITHIUM

[75] Inventors: Soichiro Kawakami; Naoya Kobayashi, both of Nara, Japan

[73] Assignee: Canon Kabushiki Kaisha, Tokyo, Japan

[21] Appl. No.: 615,599

[22] Filed: Mar. 13, 1996

[30] Foreign Application Priority Data

Mar. 17, 1995 [JP] Japan .................... 7-058802
Feb. 23, 1996 [JP] Japan .................... 8-036690

[51] Int. Cl.$^6$ .................... H01M 4/58; H01M 4/38
[52] U.S. Cl. .................... 429/224; 429/209; 429/218
[58] Field of Search .................... 429/218, 209, 429/224

[56] References Cited

U.S. PATENT DOCUMENTS

| | | | |
|---|---|---|---|
| 4,283,470 | 8/1981 | Freeman et al. | 429/209 |
| 4,360,575 | 11/1982 | Brennan | 429/209 X |
| 4,702,977 | 10/1987 | Hiratsuka et al. | 429/194 |
| 4,959,281 | 9/1990 | Nishi et al. | 429/194 |
| 5,434,023 | 7/1995 | Teraoka et al. | 429/218 |
| 5,482,797 | 1/1996 | Yamada et al. | 429/218 |
| 5,491,037 | 2/1996 | Kawakami | 429/49 |
| 5,510,212 | 4/1996 | Delnick et al. | 429/218 |

FOREIGN PATENT DOCUMENTS

| | | | |
|---|---|---|---|
| 62-122066 | 6/1987 | Japan | H01M 4/58 |
| 2-66856 | 3/1990 | Japan | H01M 10/40 |

OTHER PUBLICATIONS

Journal of the Electrochemical Society, vol. 117, No. 2, Feb. 1970, "Electrochemical . . . Graphite", pp. 222–224.

Journal of Applied Electrochemistry, vol. 22, N. Kumagai et al., "Cycling Behaviour of Lithium . . . Cells", pp. 620–627. 1992 (no month).

Charge–Discharge Mechanism of Carbon Negative Electrodes for Lithium Secondary Cells, R. Kanno et al., Feb. 1, 1989.

Charge–Discharge Reaction of Graphitized MCMB as an Anode for Lithium Secondary Battery, A. Nabuchi et al., 1993. (no month).

*Primary Examiner*—John S. Maples
*Attorney, Agent, or Firm*—Fitzpatrick, Cella, Harper & Scinto

[57] ABSTRACT

The present invention is directed to provide a secondary battery using lithium which includes at least a negative electrode, a positive electrode, a separator provided between said negative electrodes and said positive electrode, and an electrolyte, wherein at least either of said negative electrode or said positive includes an active material having porous hollow structure as a host for intercalating/deintercalating guest lithium ion. The secondary battery shows high electric capacity, high charging/discharging efficiency, high energy density, and long cycle life.

14 Claims, 6 Drawing Sheets

SECONDARY BATTERY USING LITHIUM

BACKGROUND OF THE INVENTION

1. Field of the Invention

The present invention relates to a secondary battery using lithium, and particularly a secondary battery in which the formation of lithium dendrite can be suppressed during charging/discharging cycles.

2. Description of the Related Art

In recent years, since the amount of carbon dioxide has increased in air, global warming is anticipated by the greenhouse effect due to carbon dioxide gas. Construction of new thermoelectric power stations, which convert the energy formed from the combustion of fossil fuels such as coal and petroleum to electric energy and emit carbon dioxide has been discouraged. The most efficient power generation at the thermoelectric power station is a predetermined stationary operation. Since changing of the level of the power generation is difficult, the level is generally adjusted to daytime consumption levels, when electric power is consumed by factory operations and the like. Thus, much of generated electric power is not used at night when the consumption of electric power considerably decreases. One of proposed effective use of electric power, generated in thermoelectric power stations, is "load leveling" which levels the load of power stations by storing electric power in secondary batteries located in house during night and by using the stored power in the daytime. Secondary batteries, therefore, have been eagerly required for use in load leveling. Further, secondary batteries having higher energy density are also required for use in electric vehicles, that do not exhaust contaminants, such as carbon oxides ($CO_x$), nitrogen oxides ($NO_x$), hydrocarbons (HC), and particles. Moreover, smaller, lighter, high performance secondary batteries are demanded for power sources of portable electric devices, such as book type personal computers, word processors, portable video cameras, and cellular telephones.

Since the report of a lithium-graphite interlayer compound as an example of a negative electrode for compact, light secondary batteries in "Journal of the Electrochemical Society, 117, 222(1970)", locking chair type secondary batteries, i.e., "lithium ion batteries", have been intensively developed and partially have been put into practical use. The carbon and a lithium ion doped interlayer compounds used as active material for negative and positive electrodes, respectively, lithium is intercalated in the interlayer of carbon during the charging reaction. In lithium ion batteries, long cycle life can be accomplished by suppressing the lithium dendrite deposition during charging/discharging cycles, by means of the use of host carbon, which intercalates guest lithium, as a negative electrode.

Applications of various carbonaceous materials have been intensively studied or proposed for use as negative electrodes feasible for long life secondary batteries. U.S. Pat. No. 4,702,977 (corresponding to Japanese Patent Open-Laid No. 62-122,066) discloses a secondary battery which uses alkaline metal ions such as lithium ions and a carbonaceous material, having a hydrogen/carbon atomic ratio of not more than 0.15, a spacing of (002) plane of at least 0.337 nanometer, and a crystallite size in the direction of c axis of not greater than 15 nanometer, as a negative electrode. U.S. Pat. No. 4,959,281 (corresponding to Japanese Patent Open-Laid No. 2-66,856) discloses a secondary battery which uses a carbonaceous material, having a spacing of (002) plane of not less than 0.370 nanometer, a true density of less than 1.70 g/cm$^3$, and not having an exothermic peak at not less than 700° C. as measured by a differential thermal analysis in air stream, as a negative electrode. Examples of applications of various carbonaceous materials to the negative electrode include a carbon fiber in "Denki Kagaku (Electrochemistry), Vol 57, p. 614 (1989)"; a mesophase fine sphere in "Abstracts of the 34th Battery Symposium in Japan, p. 77 (1993)"; a natural graphite in "Abstracts of the 33rd Battery Symposium in Japan, p. 217 (1992)"; a graphite whisker in "Abstracts of the 34th Battery Symposium in Japan, p. 7 (1993)"; and a calcined furfuryl alcohol resin in "Abstracts of the 58th Annual Meeting of Electrochemical Society of Japan, p. 15 (1991)".

However, no lithium ion battery using a carbonaceous material as a negative electrode active material for storing lithium has been developed, in which discharging capacity after charging/discharging cycles exceeds the theoretical capacity of the graphite interlayer compound which can store a lithium atom per six carbon atoms. Therefore, the lithium ion battery using a carbonaceous material as a negative electrode active material has a long cycle life, but does not have an energy density which competes with those of lithium batteries using metallic lithium itself as a negative electrode active material.

High capacity lithium batteries using metallic lithium as a negative electrode are impractical, since it is difficult to suppress the formation of lithium dendrite, which forms during repeated charge/discharge cycles and often causes internal shorts. When internal shorts between the negative electrode and the positive electrode are caused by the dendritic deposition of lithium metal, the energy in the battery is rapidly consumed to form heat at the short portion, thus the solvent in the electrolyte solution is pyrolyzed to form gas. As a result, the inner pressure of the battery is increased such that the battery is damaged. Although suppressing the reactivity of lithium by using lithium alloys such as lithium-aluminum for the negative electrode has been proposed, lithium's cycle life is still not satisfactory for wide practical use.

"Journal of Applied Electrochemistry, 22, p. 620–627 (1992)" discloses a lithium secondary battery using a surface etched aluminum foil as the negative electrode and having a high energy density. The density is still lower than that of a lithium primary battery. The battery, however, causes decreased chargeability due to cracks in the aluminum foil after repeated expansion/shrinkage cycles and the dendritic deposition of lithium metal, so that this battery still does not have a practical cycle life.

Accordingly, negative electrode materials having a long life and higher energy density than that of carbonaceous negative electrodes practically used have been eagerly anticipated.

Moreover, development of new positive electrode materials is essential for the realization of secondary batteries having higher energy densities. Although lithium-transition metal oxides in which lithium ions are intercalated in an interlayer compound are now mainly used as a positive electrode active material, its discharging capacity is merely 40 to 60% of the theoretical capacity.

In lithium secondary batteries including "lithium ion batteries" which use lithium ions as guests for charge/discharge reaction, there are strong demands for development of higher capacity electrodes than currently available carbonaceous negative electrodes and transition metal oxide positive electrodes having practical cycle lives.

SUMMARY OF THE INVENTION

An object of the present invention is to provide a lithium secondary battery, using lithium ions as guests for charge/discharge reaction, having a high energy density and long cycle life.

Another object of the present invention is to provide a lithium secondary battery having a high charge/discharge efficiency and high energy density.

A further object of the present invention is to provide a lithium secondary battery electrochemical reaction accompanied with charge/discharge which proceed at a lower current density.

A still further object of the present invention is to provide a lithium secondary battery having a long life and highly reliable performance, in which no or few lithium dendrites form during repeated charge/discharge cycles.

A still another object of the present invention is to provide a lithium secondary battery comprising a negative electrode, a positive electrode, a separator provided between the negative electrode and the positive electrode, and an electrolyte, wherein at least one of the negative electrode and the positive electrode comprises an active material having porous hollow structure.

DETAILED DESCRIPTION OF THE PREFERRED EMBODIMENTS

Figure 1:
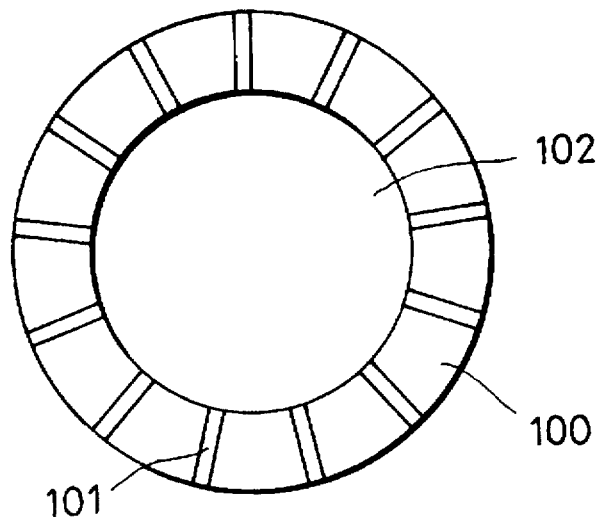
FIGS. 1, 2 and 3 are outlined cross-sectional views of active materials having porous hollow structures.

In the present invention a lithium secondary battery comprising a negative electrode, a positive electrode, a separator provided between the negative electrode and the positive electrode, and an electrolyte, at least one of the negative and positive electrodes has porous hollow structure in the present invention. When the negative and/or positive electrode(s) is composed of an active material having such a porous hollow structure, the contacting area with the electrolyte increases so lithium ions readily move during the electrochemical reaction. The porous hollow structure can also suppresses the strain due to the volume increase in the active material accompanied with the intercalation of lithium. Thus, the electrochemical reaction effectively proceeds during charging/discharging cycles, a large current is available, the battery capacity increases, and the electrode damage can be suppressed during repeated charge/discharge cycles. This porous hollow active material can provide a high capacity, long life lithium secondary battery enabling a rapid charge.

When a conductive material is incorporated into the hollow section of the active material used for the negative and/or positive electrode(s), its current collecting capability is further improved. As a result, fast charge capability, high rate performance and charge/discharge efficiency is improved, resulting in a higher capacity, rapidly chargeable secondary battery.

When the active material of the negative electrode having porous hollow structure comprises at least carbon or a metal oxide in the present invention, lithium which deposits during charging does not directly contact with the electrolyte solution, so the propagation of the lithium dendrite can be suppressed and the cycle life is improved. When the active material of the negative electrode having porous hollow structure comprises at least a metal, lithium deposits on the metal surface and the deposited lithium makes an alloy with the metal, so the storing capacity of lithium per unit volume of the negative electrode increases and the high capacity battery can be achieved.

In the present invention, when using carbon containing an element selected from Group IIIB elements, Group IVB elements, Group VB elements, Group VIB elements, and Group VIIB elements as the active material having porous hollow structure, more lithium can be intercalated, the reactivity of the carbon with impurities can be reduced, and the cycle life is improved. In particular, when carbon is substituted for boron in Group IIIB, silicon in Group IVB, or nitrogen or phosphorus in Group VB, the crystal lattice of carbon is extended so that the space to intercalate lithium is extended. Thus, the volume expansion after lithium intercalation decreases, and fatigue deterioration based on the expansion/shrinkage cycle is satisfactorily suppressed. Further, by combining carbon as the negative electrode with oxygen in Group VIB, or fluorine or chlorine in Group VIIB, the reactivity of carbon with impurities in the electrolyte solution during charging can be satisfactorily decreased. As a result, a negative electrode having a higher capacity and longer life can be realized.

As described above, a high electric capacity and energy density of the secondary battery can be achieved by using an active material having porous hollow structure as the positive and negative electrodes as a host material which can intercalate and deintercalate lithium ions.

In the present invention, a material which can electrochemically and reversibly intercalate and deintercalate lithium is called active material of the lithium secondary battery.

The present invention will be explained in further detail based on the figures.

Figure 2:
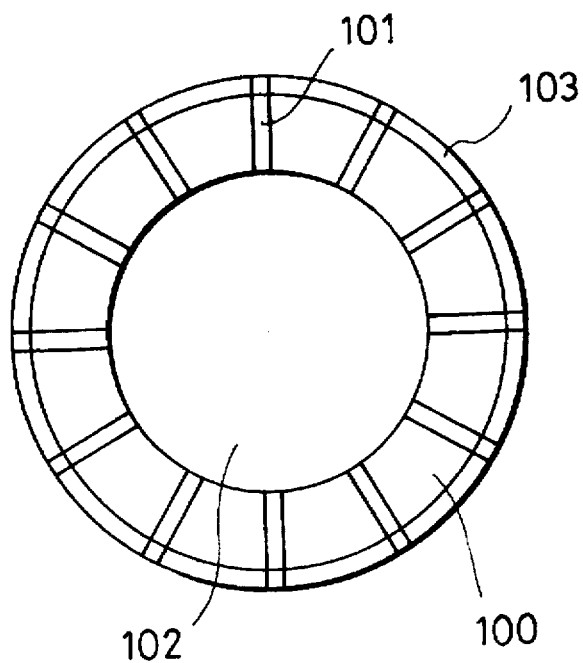
Figure 3:
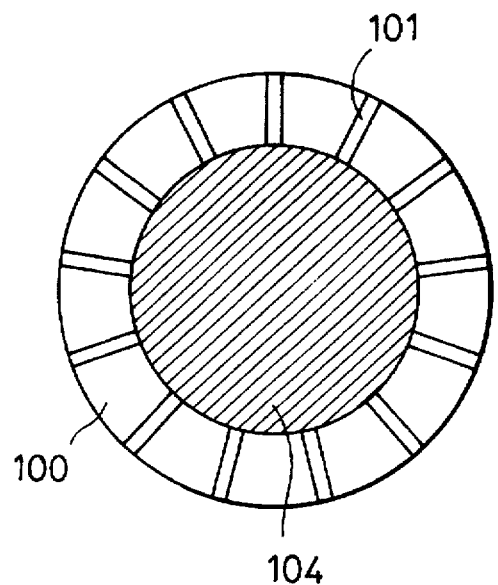
Figure 4:
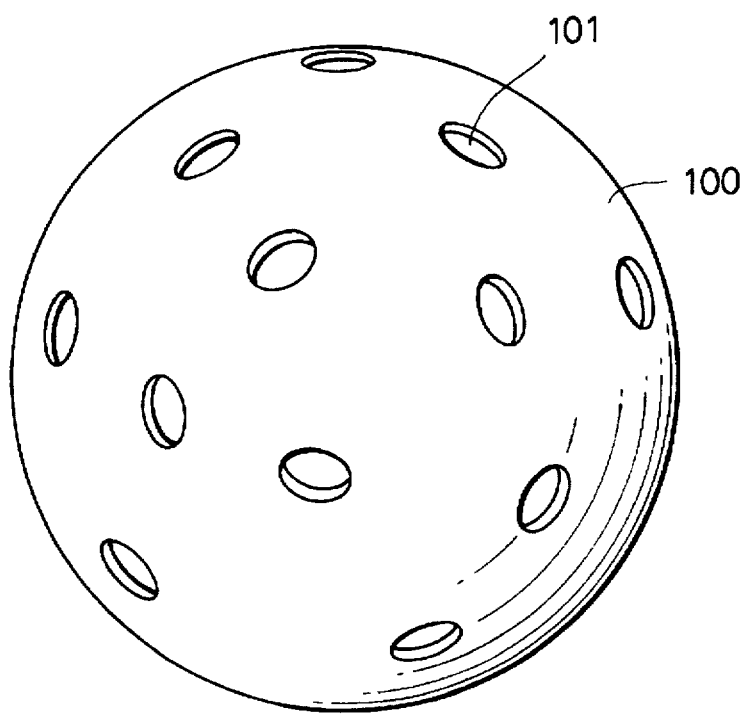
FIG. 4 is a perspective view of the active material shown in FIG. 1.
Figure 9:
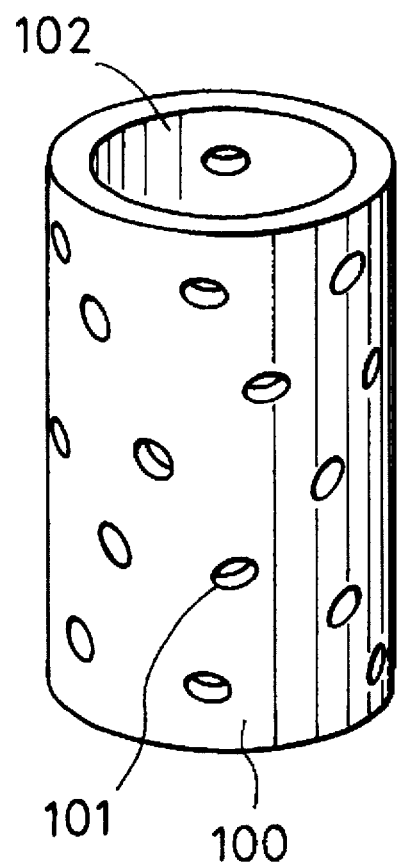
FIG. 9 is a perspective view of the active material having a cylindrical structure.

FIGS. 1, 2 and 3 are outlined cross-sectional views illustrating active materials having porous hollow structures for the positive and negative electrodes as the host materials of lithium ions in the present invention. FIG. 4 is a perspective view of the active material shown in FIG. 1, and FIG. 9 is a perspective view of the active material having a cylindrical structure. In FIGS. 1 through 4, 100 represents a raw active material, 101 represents fine pores, 102 represents a hollow section, 103 represents a skin layer, and 104 represents a hollow section filled with conductive material.

Active materials shown in FIGS. 1 and 4 have a structure in which the raw active material 100 having fine pores 101 forms the hollow section 102. In FIG. 9, the hollow section 102 is a cylindrical shape.

The active material, shown in FIG. 2 provides a skin layer 103 outside the raw active material 100. Examples of the skin layer 103 may include a surface oxide layer to improve oxidizing stability of the raw active material 100 in air, and a reaction retardation layer such as a halide layer to suppress the reactivity the raw active material with the electrolyte solution.

FIG. 3 is an embodiment of the active material in which a conductive material 104 is provided inside the hollow section 102 in FIG. 1. The smaller diameter of the active material having a hollow structure is preferred to enhances the packing density and thus the electric capacity of the battery, although depending the preparing and pulverizing processes of the active material. Since, excessively small diameter, however, causes the difficulty in handling, the desirable diameter of the hollow active material ranges from 0.01 micron to 100 microns, and preferably from 0.1 micron to 10 micron. The size of the fine pore is desirably around one-tenth or less of the diameter of the active material.

Figure 5:
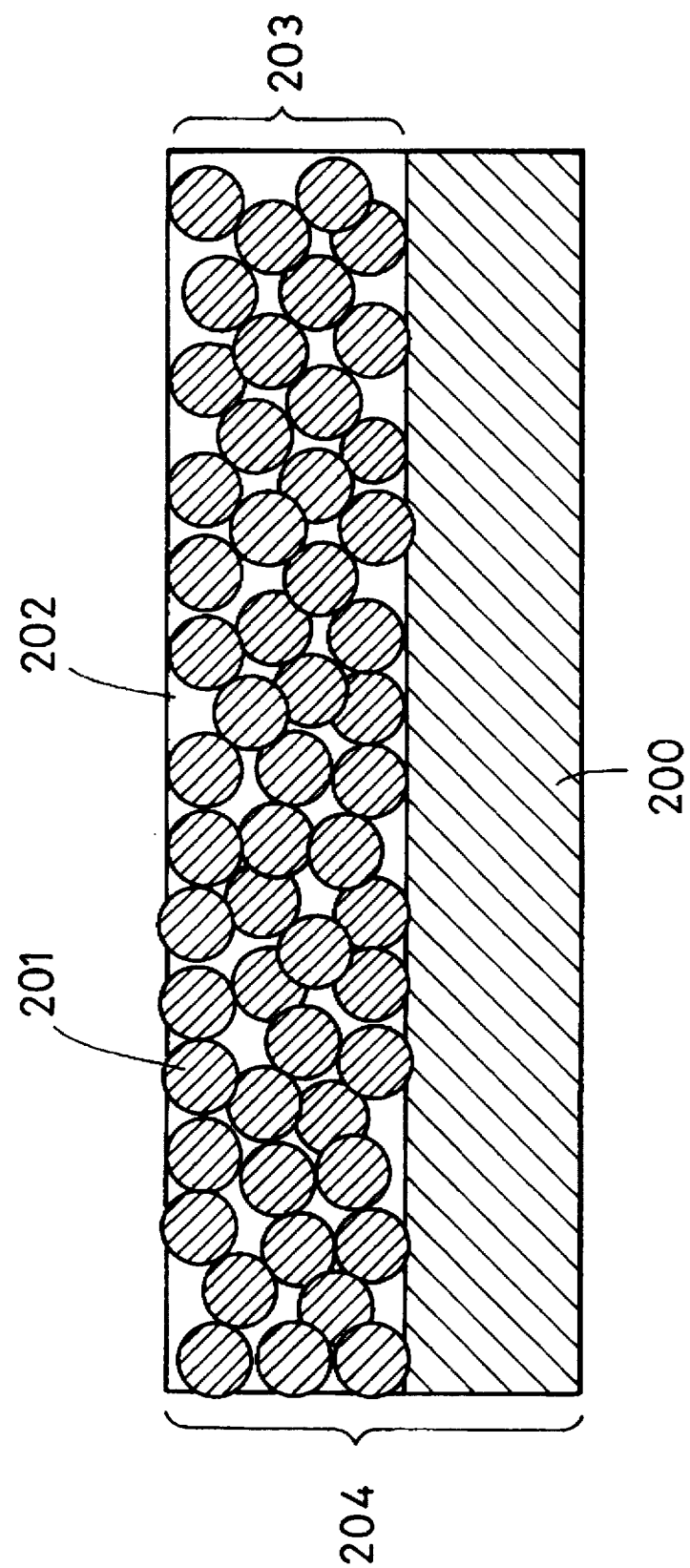
FIG. 5 is an outlined cross-sectional view illustrating a preferred embodiment of an electrode using an active material having a porous hollow structure.

FIG. 5 is an outlined partly cross-sectional view illustrating a preferred embodiment of one side of a positive or negative electrode used for the secondary battery of the present invention. Therefore, the active material layers can be provided on both sides of the collector 200. The positive or negative electrode 204 includes an active material layer 203 for the positive or negative electrode, i.e., a porous hollow active material having a cross-sectional shape as shown in either of FIGS. 1 through 3, which is provided on the collector 200 by binding with a binder 202. In real batteries, the active material layer 203 of the positive or negative electrode contacts with the electrolyte, although not shown in FIG. 5. The active material layer is preferably formed by adding a auxiliary conductive material into the binder, when the conductivity of the porous hollow active material 201 is too low. The content of the active material in the active material layer is desirably 50 wt % or more, and preferably 70 wt % or more in order to maintain a higher capacity of the battery.

Porous hollow structured lithium-transition metal oxide, as a raw active material for the positive electrode, is prepared by using an interfacial reaction. In detail, a nonionic surfactant is dissolved in an organic solvent, which is slightly miscible or immiscible to water, then the aqueous transition metal salt solution is mixed to prepare the emulsion. After reacting with a lithium salt or aqueous LiOH solution, the mixture is dried and calcined to obtain a lithium-transition metal oxide compound having porous hollow structure. Moreover, active material particles for a positive electrode, having porous hollow structure and provided with a conductive material in the hollow section, may be readily prepared. For example an aqueous transition metal salt solution in which conductive powder such as metal powder is used to prepare the above-mentioned emulsion.

The active material particles for the negative electrode can also be prepared by a method similar to that of the active material particles for the positive electrode.

A preferred process will be explained for preparing metallic particles each having porous hollow structure. The preferred process includes the reduction of the metal oxide particles, which is prepared by a method similar to that of the active material particles for the positive electrode, by heating in a hydrogen gas reductive atmosphere or by exposing to hydrogen plasma. The resulting metallic fine particles readily react with oxygen in air due to its larger specific surface area. Since handling occasionally affects the properties of the prepared battery including stability, it is preferred that the metal surface is allowed to react with oxygen in a liquid medium or under a reduced pressure so as to steadily form a surface oxide film or with hydrofluoric acid so as to form a surface halide film. The process causes the increase in the resistance against the reaction. Moreover, the effective processes for oxidative resistance include a plasma treatment using a halogenated hydrocarbon or nitrogen gas. Such oxidization, halogenation, and nitridation further suppress the side reaction with the organic solvent in the electrolyte solution with impurities during charging/discharging.

Another preferred process for producing metallic particles having porous hollow structure includes dispersing organic polymer fine particles into an electroless plating or chemical plating solution; forming metallic film on each organic polymer fine particle by reduction; and dispersing the organic polymer fine particle covered with the metallic film into a solvent to dissolve out the organic polymer. A metallic active material for the negative electrode can also be prepared in a similar manner.

A preferred process for forming the porous hollow structure using carbon as the active material for the negative electrode will be explained. The carbon having porous hollow structure is prepared as follows: Air or a liquid which has no affinity to the polymer is flowed through the center of a coaxial double cylinder nozzle; a melt polymer or a polymer solution is flowed through between the cylinders to spin a hollow polymer fiber; then the fiber is calcined and pulverized.

Another preferred embodiment for preparing the porous hollow carbon is carbonization of the trachea and tracheid of plants. For example, after carbonizing plants, the residue is optionally oxidized, etched with alkaline, calcined and pulverized to form the porous hollow carbon. Carbonization is preferably carried out in an inert gas or nitrogen gas atmosphere at 600° to 3,000° C. Optional oxidation is preferably carried out in air at 250° to 400° C.

A further preferred embodiment for preparing the porous hollow carbon includes dissolving a nonionic surfactant and an organic polymer into an organic solvent slightly miscible or immiscible to water; mixing a solvent that does not dissovle the organic polymer, water or an aqueous solution in which an inorganic compound is dissolved to prepare an emulsion; dropping the emulsion into a solvent which does not dissolve the organic polymer to deposit the organic polymer; then drying and calcining the organic polymer.

Examples of the preferred organic polymer as a raw material of the above-described carbon may include polyvinyl alcohol, polyfurfuryl alcohol, polyvinyl acetate, polyacrylonitrile, poly-para-phenylene, poly-para-phenylene sulfide, poly-paraphenylene vinylene, polythienylene, polydithienylpolyene, polyvinylnaphthalene, polyvinyl chloride, polyaniline, polypyrrole, furan resins, and silicone resins.

Calcination for obtaining the carbonaceous material is preferably carried out in an inert gas or nitrogen gas atmosphere at 600° to 3,000° C. Higher calcination temperature causes easier propagation of the graphite crystalline.

By substituting at least partly the carbon atoms for at least one element selected from the group consisting of Group IIIB elements, Group IVB elements, Group VB elements, Group VIB elements, and Group VIIB elements in a periodic table, the crystal axis is extended, the more lithium is intercalated during charging, the strain during intercalation is decreased, and the reaction of carbon atoms with the electrolyte solution can be decreased. Accordingly, the negative electrode for a high capacity, long life lithium secondary battery can be formed. A preferred embodiment for preparing the porous hollow carbon containing the above-mentioned elements is a method using a polymer containing at least one element selected from the group consisting of Group IIIB elements, Group IVB elements, Group VB elements, Group VIB elements, and Group VIIB elements of the periodic table, as a raw material of the carbon.

Another preferred embodiment for preparing the carbon includes mixing the raw polymer with a compound containing the above element or elements which is readily decomposed during calcination; and calcination of the mixture.

The content of the element added into the carbonaceous material is preferably 1 to 20 atomic percent of the resulting porous hollow carbonaceous material after calcination in order to obtain the electrode having a higher electric capacity. Examples of preferred elements added include boron in Group IIIB, silicon in Group IVB, nitrogen and phosphorus in Group VB, sulphur in Group VIB, and fluorine and chlorine in Group VIIB. Between them, boron is most suitably added. Examples of preferred boron compounds added into the raw polymer before calcination include triallylboron, such as triphenylboron, tri-p-tolylboron; borane complexes, such as borane-4-methylmorpholine complex, borane-4-methyl-phenylmorpholine complex, borane-piperazine complex, borane-piperidine complex, boranepolyvinylpyridine complex, borane-tetrahydrofuran complex, borane-triethylamine complex, borane-trimethylamine complex, borane-methyl sulfide complex, and borane-methyl-1,4-oxathiane complex; tetraphenylborate compounds, such as sodium tetraphenylborate.

An outlined construction of the secondary battery based on the present invention will be explained referring to FIG. 6, in which 301 represents a negative electrode, 302 represents a positive electrode, 303 represents electrolyte, 304 represents a separator, 305 represents a negative electrode terminal, 306 represents a positive electrode terminal, and 307 represents a housing.

Figure 6:
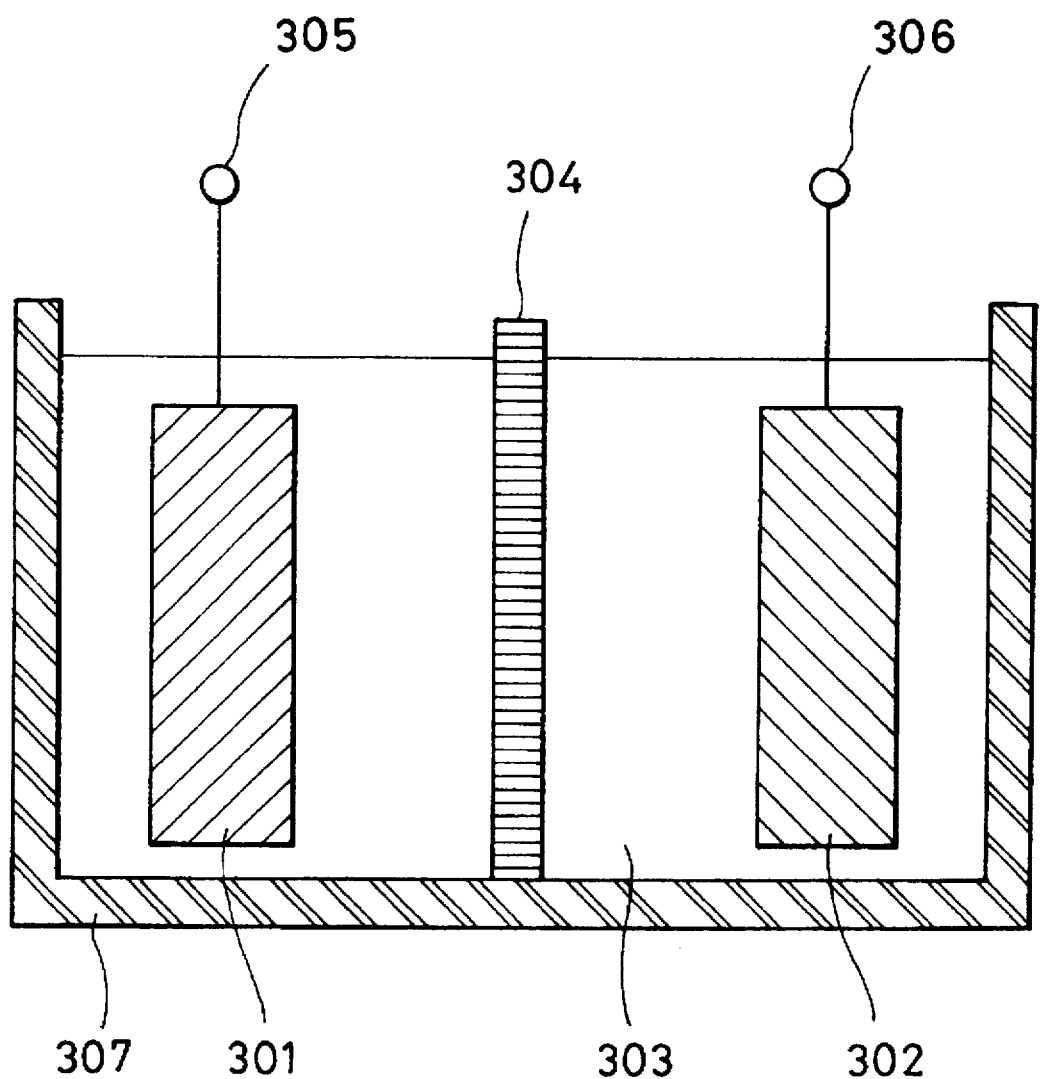
FIG. 6 is an outlined cross-sectional view illustrating of the basic structure a secondary battery using the electrode shown in FIG. 5.

The negative electrode 301 and the positive electrode 302 are oppositely provided through the separator 304 in the electrolyte 303 hold in the housing 307 as shown in FIG. 6. The separator 304 is provided so as to prevent shortening due to the contact between the negative electrode 301 and the positive electrode 302. Each of the negative electrode 301 and the positive electrode 302 have a structure as shown in FIG. 5, and the positive electrode terminal 306 and the negative electrode terminal 305 are electrically connected with respective collecting electrodes, where the positive electrode terminal 306 and the negative electrode terminal 305 may be respective collecting electrodes, or at least a part of the positive electrode terminal 306, negative electrode terminal 305, or collecting electrode may be comprised of at least a part of the housing.

Then, the components of the battery will be explained.
[Active Material for Positive Electrode]

Preferred examples of raw materials for the positive active material include transition metal oxides, transition metal sulfides, lithium-transition metal oxides, and lithium-transition metal sulfides. Transition metal elements, i.e., constituent elements of transition metal oxides and transition metal sulfides, are elements, partly having d shell or f shell. Transition metal element desirably used is at least one element selected from the group consisting of scandium, yttrium, lanthanoid elements, actinoid elements, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, and gold. Between them, at least one element selected from the group of the first transition series metals, i.e., titanium, vanadium, chromium, manganese, iron, cobalt, nickel, and copper is preferably used.
[Active Material for Negative Electrode]

Preferred examples of raw materials for the negative active material include carbonaceous material, metals, metal oxides. Preferred carbonaceous materials have graphite structures which can intercalate lithium between its interlayer. Metal preferably used is at least one element selected from the group consisting of copper, nickel, aluminum, titanium, tin, lead, zinc, chromium, iron, platinum, and palladium. Metal oxides preferably used is at least one element selected from the group consisting of tungsten, molybdenum, titanium, vanadium, niobium, zirconium, tantalum, and chromium.

Preferred active material particles each having porous hollow structure may include metal oxide particles, metal particles, and carbon.

A preferred example for preparing the metal oxide particles as the active material particles each having porous hollow structure will be explained with active material particles for the positive electrode.
[Positive Electrode]

The positive electrode of the present invention includes, for example, at least the above-mentioned porous hollow active material of the positive electrode, the binder, the collector, and optionally the auxiliary conductive material as described above.

A preferred example for preparing the positive electrode is as follows: First, the porous hollow active material of the positive electrode, the binder, and optionally the auxiliary conductive material are mixed, and a solvent is added into the mixture to prepare a paste while adjusting to a given viscosity. Then, the paste is coated on the collector and dried to form the positive electrode.

Preferably applicable coating methods includes, for example, coater coating and screen printing. Preferred examples of the auxiliary conductive material are amorphous carbon such as carbon black, for example, powder or fibrous acetylene black and ketjen black; graphite; metals inactive to the battery reaction.

Desirable binders usable for the positive electrode for a non-aqueous electrolyte solution may be, for example, polyolefinic resins, such as polyethylene and polypropylene; fluorine resins, such as polyvinylidene fluoride, tetrafluoroethylene polymer.

The positive electrode collector of the present invention fills the role of effectively supplying the current consumed by the battery reaction during charging or effectively collecting the current which occurs during discharging. Therefore, desirable materials for the positive electrode collector are those that are highly conductive and inactive to the battery reaction. Examples of the desirable materials include nickel, titanium, copper, aluminum, stainless-steel, platinum, palladium, gold, zinc, various alloys, a complex metal comprising at least two kinds of the above materials. When copper or zinc is used, copper or zinc is readily dissolved and deposited on the negative electrode during charging. Thus, these metals are desirably used after being coated with a more inactive metal, such as nickel or titanium. The shape of the collector may be plate, foil, mesh, sponge, fibrous, punched metal, expanded metal or the like.
[Negative Electrode]

The preferred negative electrode of the present invention includes, for example, at least the above-mentioned porous hollow active material of the negative electrode, the binder, the collector, and optionally the auxiliary conductive material as described above.

A preferred example for preparing the negative electrode is as follows: First, the porous hollow active material of the negative electrode, and the binder are mixed, and a solvent is added into the mixture to prepare a paste while adjusting to a given viscosity. Then, the paste is coated on the collector and dried to form the negative electrode.

When the conductivity of the active material for the negative electrode is low, the auxiliary conductive material similar to that in the positive electrode is preferably added before the paste preparation in order to enhance the collecting ability. The usable binders are similar to those for the positive electrode. The materials and shapes of the collectors are also similar to those for the positive electrode.

Preferably applicable paste coating methods includes, for example, coater coating and screen printing.

[Separator]

The separator in the present invention is provided to prevent the shorting between the negative and positive electrodes, and occasionally to retain the electrolyte solution.

The separator must have fine pores through which at least lithium ions can migrate, and must be stable to the electrolyte solution. Thus, the preferred raw materials for the separator are, for example, glass; polyolefin polymers, such as polypropylene, and polyethylene; fluorine resins; and the like. These materials are preferably used as nonwoven fabric and micropore members. Metal oxide films having micropores and hybrid members of metal oxide and resin film can also be used for the separator. In particular, a multilayered metal oxide film effectively prevents the shorting since the lithium dendrite hardly passes through the multilayered film. The safety may be further enhanced by using a fire retardant fluorine resin film, incombustible glass, or metal oxide film.

[Electrolyte]

In the present invention, the electrolyte can be used in the following three states:

(1) Using the electrolyte as is;

(2) As a solution by dissolving the electrolyte into an adequate solvent; and (3) As a fixed state by adding a gelling agent such as a polymer into the solution.

In general, the electrolyte is used as an electrolyte solution dissolved into an solvent and retained on a multipore separator. The conductivityor mthe electrolyte is desirably $1 \times 10^{-3}$ s/cm or more, and preferably $5 \times 10^{-3}$ s/cm or more at 25° C.

In lithium batteries, The following electrolytes and solvents are preferably used.

Examples of the preferred electrolytes include acids such as $H_2SO_4$, HCl, and $HNO_3$; salts comprising lithium ion (Li+) and Lewis acids, such as $BF_4-$, $PF_6-$, $ClO_4-$, $AsF_6-$, $CF_3SO_3-$, and $BPh_4-$ wherein Ph means a phenyl group; mixed salts thereof. Salts comprising cations, such as sodium ion, potassium ion, tetraalkylammonium ion and Lewis acids may also be used. It is preferred that these salts be thoroughly dehydrated and free of oxygen heating under a reduced pressure.

Examples of the preferred solvent for the electrolytes include acetonitrile, benzonitrile, propylene carbonate, ethylene carbonate, dimethyl carbonate, diethyl carbonate, dimethylformamide, tetrehydrofuran, nitrobenzene, dichloroethane, diethoxyethane, 1,2-dimethoxyethane, chlorobenzene, γ-butyllactone, dioxolan, sulfolane, nitromethane, dimethyl sulfide, dimethyl sulfoxide, methyl formate, 3-methyl-2-oxazolidinone, 2-methyltetrahydrofuran, 3-propylsydnone, sulfur dioxide, phosphoryl chloride, thionyl chloride, sulfuryl chloride, and mixtures thereof.

Preferably, these solvents are dehydrated with, for example, activated alumina, molecular sieve, phosphorus pentoxide, or calcium chloride; or are dehydrated while eliminating impurities by distillation with an alkaline metal in an inert gas stream according to solvents.

Gelation is preferred in order to prevent the leakage of the electrolyte solution. Desirable gelling agents are polymers which can absorb the solvents in the electrolyte solution to swell. Preferred polymers may include poly(ethylene oxide), and poly(vinyl alcohol), and poly(acrylamide).

[The Structure and Shape of the Battery]

There may be various shapes, such as flat, cylindrical, prismatic type, and sheet on the battery of the present invention. The structure of the battery is, for example, monolayer type, multilayer type, or spiral type. Between them, the spiral type batteries are preferred because the electrodes area can be increased by coiling the separators between the negative and positive electrodes so that a higher current can be flowed during charging/discharging. The prismatic type batteries are also preferred since the storage space of the secondary batteries in an instrument can be effectively utilized.

Figure 7:
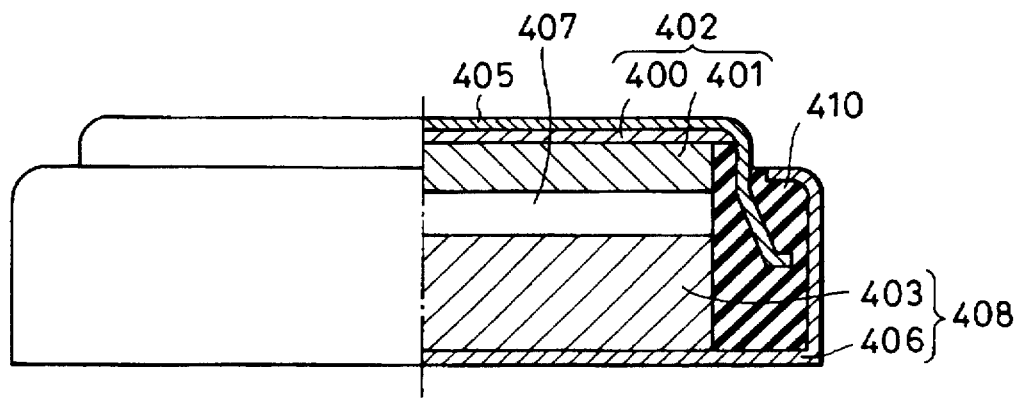
FIG. 7 is a schematic partial cross-sectional view showing an embodiment of a monolayer type flat secondary battery.

An embodiment of the shape and structure of the battery will be explained in further detail referring to FIGS. 7 and 8. FIG. 7 is a schematic partial cross-sectional view showing an embodiment of a monolayer type flat secondary battery, and FIG. 8 is a schematic partial cross-sectional view showing an embodiment of a spiral type cylindrical secondary battery.

Figure 8:
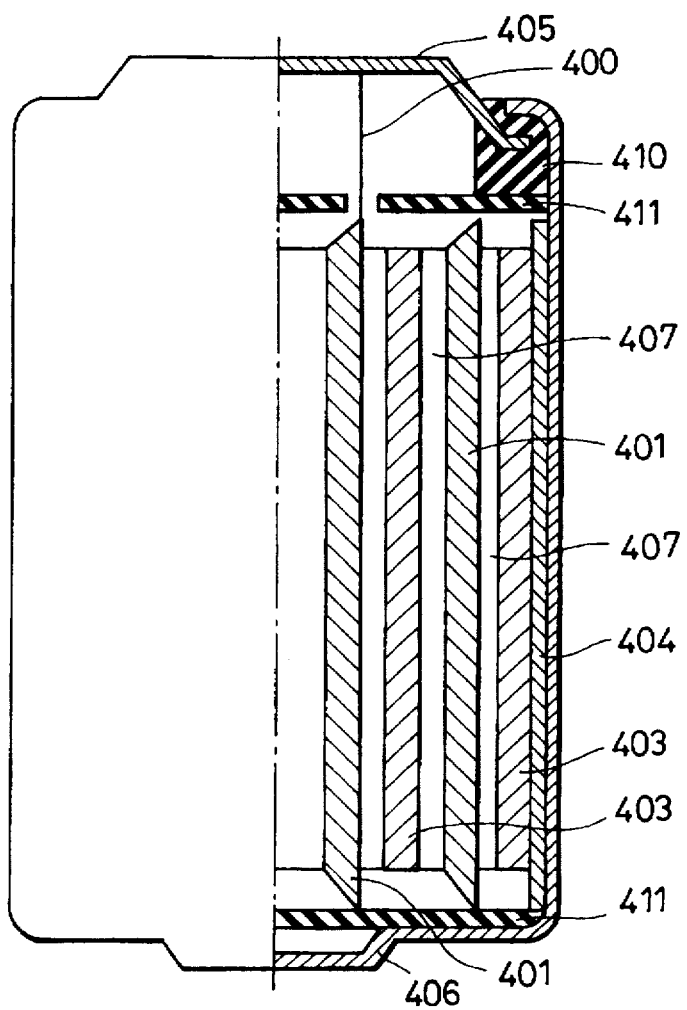
FIG. 8 is a schematic partial cross-sectional view showing an embodiment of a spiral type cylindrical secondary battery.

In FIGS. 7 and 8,400 represents a negative electrode collector, 401 represents active material layers for the negative electrode, 402 represents a negative electrode, 403 represents active material layers for the positive electrode, 404 represents a positive electrode collector, 405 represents a negative electrode terminal or cap, 406 represents a positive electrode can, 407 represents separators, 408 represents a positive electrode, 410 represents an insulating packing, and 411 represents an insulating sheet.

A method for fabricating the batteries shown in FIGS. 7 and 8 will be explained as an example. After the separator 407 is inserted between active material layers 401 and 403 for negative and positive electrodes, these are fabricated into the positive electrode can 406. In the battery in FIG. 8, these are coiled so that the active material layer 401 for the negative electrode and the active material layer 403 for the positive electrode is opposed to each other through the separator 407 in the positive electrode can 406. After pouring the electrolyte solution into the positive electrode can 406, the negative electrode cap 405 is provided on the positive electrode can through the insulating cap 405. The batteries are completed after caulking at least one part of the positive electrode can and/or negative electrode cap.

It is preferred that the preparation of battery materials and fabrication of batteries are carried out in dry air atmosphere in which water is thoroughly removed or in an inert gas atmosphere.

[Insulating Packing]

Examples of the insulating packing 410 used for the present invention include polyolefin resins, fluorine resins, polyamide resins, polysulfone resins, and various elastomers. Other sealing methods including glass tube sealing, adhering, welding, soldering and the like may also be used instead of caulking using a gasket such as the insulating packing shown in figures.

Preferred materials for the insulating sheet 411 shown in FIG. 8 include various organic resins and ceramics which are chemically stable to the electrolyte and the working environments, for example, temperature.

In FIGS. 7 and 8, housings of the batteries correspond to positive electrode cans 406 and negative electrode caps 405. Preferred housing materials are various stainless steels, and in particular titanium-clad stainless steel sheets, copper-clad stainless steel sheets, and nickel-plated steel sheets, since the stainless steel have a sufficient strength. However, when the positive electrode can and the negative electrode cap do not act as the housing, such a strength is not required for them, and thus other materials, such as various metals including zinc, plastics such as polypropylene, and composite materials of a metal or glass fiber and a plastic, may also be used for the housing instead of the stainless steel.

The battery is generally provided with a safety valve which operates to release an extraordinarily pressurized atmosphere in the battery. Examples of the safety valve may include an elastomer, spring, metallic ball, breakable foil, and the like. Further, by partly decreasing the strength of the battery, the extraordinarily pressurized atmosphere may be released after breakage of the weak section.

EXAMPLES

The present invention will now be explained based on examples. The present invention is not limited to these examples.

Example 1

In EXAMPLE 1, a lithium secondary battery having a structure as shown in FIG. 7 was made. An aluminum foil is used for a negative electrode, and a porous hollow active material is used for a positive electrode.

Preparations of battery components and battery fabrication will be explained referring to FIG. 7.

(1) Preparation of Negative Electrode

A negative electrode was prepared as follows: After the natural oxide film on the aluminum surface was removed by etching in the 4 weight percent aqueous sodium hydroxide solution, the foil surface was neutralized with 20 weight percent aqueous nitric acid, washed with water and dried at 150° C. under a reduced pressure.

(2) Preparation of Positive Electrode

First, a 2M (mol/l) aqueous manganese acetate solution and the 20 g/l hexane solution of a nonionic surfactant (polyoxyethylnesorbitan triolate) were mixed together in the volume ratio of 1:2, then the mixture was emulsified in a emulsifier for 1 minute at 4,000 rpm. Into the resulting emulsion, 1M of an aqueous lithium citrate solution was gradually dropped to react within 30 minutes. After eliminating the oil layer from the resulting solution by centrifugation, the residue is dried with a spray dryer, and calcined to obtain a porous lithium-manganese oxide powder at 400° C. in air.

After 3 weight percent of acetylene black powder and 5 weight percent of polyvinylidene fluoride powder was mixed into the porous lithium-manganese oxide powder, N-methylpyrrolidone was added to prepare a paste. The resulting paste was coated, dried on the aluminum foil and further dried at 150° C. under a reduced pressure to prepare a positive electrode.

Results of scanning electron microscopy show that the lithium-manganese oxide powder has many pores and a hollow structure.

(3) Preparation of Electrolyte solution

First, an equivolume solvent of ethylene carbonate (EC) and dimethyl carbonate (DMC) was prepared, wherein water in these solvents was thoroughly removed in advance. Then, an electrolyte solution was prepared by dissolving 1M (mol/1) lithium tetrafluoroborate into the solvent.

(4) Separator

A finely porous polyethylene film was used as a separator.

(5) Fabrication of Battery

First, the separator retaining the electrolyte solution was inserted between the negative and positive electrodes, and these were packed into a positive electrode can made of a titaniumclad stainless steel. Then, a polypropylene insulating packing was placed on the positive electrode can, and the can was covered with a negative electrode cap. A lithium secondary battery was prepared by caulking the positive electrode can and the negative electrode cap. The resulting battery will be usable after charging.

Evaluation of the prepared battery will be described as below. The energy density per unit volume and cycle life were evaluated after repeated charging/discharging cycles. One cycle in the cycle test was determined to the cycle which consists of 1C of charging/discharging and 30 minutes of intermission, wherein 1C means a current corresponding to once of capacity/hour based on the electric capacity calculated from the positive electrode. Hokuto Denko HJ-106M tester was used for the charging/discharging test. The charging/discharging test started from charging, and the capacity was evaluated by the discharged quantity of electricity at third cycle, and the cycle life was taken as the cycle number when the capacity of the battery was lower than 60% of the initial capacity. The cutoff voltages during charging and discharging were set to 4.5 V and 2.5 V, respectively.

Comparative Example 1

A secondary battery was prepared in a similar way to EXAMPLE 1, but the positive electrode was prepared by the following process.

Preparation of Positive Electrode

First, 1M of an aqueous lithium citrate solution was gradually dropped into 2M (mol/l) of an aqueous manganese acetate solution within 30 minutes. The solution was dried with the spray dryer, calcined to obtain lithium-manganese oxide powder at 400° C. in air. Into the lithium-manganese oxide powder, 3 weight percent of acetylene black powder and 5 weight percent of polyvinylidene fluoride were mixed, and then N-methylpyrrolidone was added to prepare a paste. After the resulting paste was coated, dried on the aluminum foil, and further dried at 150° C. under a reduced pressure in order to obtain the positive electrode.

No hollow structure was observed in the scanning electron microscopy of the resulting lithium-manganese oxide powder.

Table 1 shows summarized results on the evaluation of the lithium secondary batteries made by EXAMPLE 1 and COMPARATIVE EXAMPLE 1. In Table 1, the cycle life, charging/discharging efficiency, i.e., the ratio of the discharged quantity of electricity to the charged quantity of electricity, and energy density per unit volume of the battery (or discharging capacity) are relatively expressed by normalizing the values in EXAMPLE 1 with those in COMPARATIVE EXAMPLE 1.

TABLE 1

| Cycle Life | 1.4 |
|---|---|
| Charging/Discharging Efficiency | 1.2 |
| Energy Density | 1.2 |

Table 1 demonstrates that the secondary lithium battery of EXAMPLE 1 using the porous hollow active material for the positive electrode has a longer cycle life, an increased charging/discharging efficiency, and a higher energy density.

Example 2

A secondary battery shown in FIG. 7 was prepared. In EXAMPLE 2, a positive electrode, made of a porous hollow active material having a conductive material in the hollow section of the active material, differing from EXAMPLE 1.

The procedure for preparing the positive electrode is as follows:

Preparation of Positive Electrode

First, the 2M (mol/l) aqueous manganese acetate solution in which nickel fine powders were dispersed and the 20 g/l hexane solution of a nonionic surfactant (polyoxyethylnesorbitan triolate) were mixed together in the volume ratio of 1:2, then the mixture was emulsified in a emulsifier for 1 minute at 4,000 rpm. Into the resulting emulsion, 1M of an aqueous lithium citrate solution was gradually dropped to react within 30 minutes. After eliminating the oil layer from the resulting solution by centrifugation, the residue is dried with the spray dryer, calcined to obtain a porous lithium-manganese oxide powder at 400° C. in air.

After 3 weight percent of acetylene black powder and 5 weight percent of polyvinylidene fluoride powder were mixed into the porous lithium-manganese oxide powder, N-methylpyrrolidone was added to prepare a paste. The resulting paste was coated, dried on the aluminum foil and further dried at 150° C. under a reduced pressure to prepare a positive electrode.

The secondary battery was made in the same manner as EXAMPLE 1.

Comparative Example 2

A secondary battery was prepared in a similar way as EXAMPLE 2, but the preparation of the active material for the positive electrode differs from that in EXAMPLE 2 as follows.

First, 1M of an aqueous lithium citrate solution was gradually dropped into 2M (mol/l) of an aqueous manganese acetate solution by spending 30 minutes. The solution was dried with the spray dryer, calcined to obtain lithium-manganese oxide powder at 400° C. in air. Into the lithium-manganese oxide powder, 3 weight percent of acetylene black powder and 5 weight percent of polyvinylidene fluoride were mixed, and then N-methylpyrrolidone was added to prepare a paste. The resulting paste was coated, dried on the aluminum foil, and further dried at 150° C. under a reduced pressure in order to obtain the positive electrode.

Table 2 shows summarized results on the evaluation of the lithium secondary batteries made by EXAMPLE 2 and COMPARATIVE EXAMPLE 2. In Table 2, the cycle life, charging/discharging efficiency, i.e., the ratio of the discharged quantity of electricity to the charged quantity of electricity, and energy density per unit volume of the battery (or discharging capacity) are relatively expressed by normalizing the values in EXAMPLE 2 with those in COMPARATIVE EXAMPLE 2. The evaluation procedures were based on the EXAMPLE 1.

TABLE 2

| Cycle Life | 1.5 |
| Charging/Discharging Efficiency | 1.1 |
| Energy Density | 1.1 |

Table 2 demonstrates that the secondary lithium battery of EXAMPLE 2 using the porous hollow active material for the positive electrode has a longer cycle life, an increased charging/discharging efficiency, and a higher energy density.

Example 3

A secondary battery shown in FIG. 7 was prepared. In EXAMPLE 3, an active material for the negative electrode, made of a porous hollow carbon, was used, significantly differing from EXAMPLES 1 and 2. Materials used other than the negative and positive electrodes and the process for making the battery were the same as EXAMPLE 1.

The processes for making the negative and positive electrodes are as follows.

(1) Preparation of Negative Electrode

First, 30 g/l of sorbitan monourate was added into a polyfurfuryl alcohol in tetrahydrofuran solution, then sodium tetraphenylborate, corresponding to 20 atomic percent of total carbon atoms of water and polyfurfuryl alcohol, was added. The mixture was emulsified for 1 minute at 3,000 rpm in the emulsifier. The obtained emulsion was dropped into ethanol, the precipitate was dried and calcined to obtain carbon powder at 800° C. in argon gas stream. After 5 weight percent of polyvinylidene fluoride was mixed into the resulting carbon powder, N-methylpyrrolidone was added to prepare the paste. The negative electrode was made by coating and drying the resulting paste on the copper foil, and by further drying at 150° C. a reduced pressure.

Many fine pores and hollow structure were observed in scanning electron microscopy from the carbon powder obtained by the above process. The results of the elemental analysis shows that the carbon powder contains boron.

(2) Preparation of Positive Electrode

First, lithium-manganese oxide was prepared by mixing electrolytic manganese dioxide and lithium carbonate by 1:0.4 molar ratio, and by heating the mixture at 800° C. After 3 weight percent of acetylene black powder and 5 weight percent of polyvinylidene fluoride powder was mixed into the lithium manganese oxide powder prepared, N-methylpyrrolidone was added to prepare a paste. The resulting paste was coated, dried on the aluminum foil and further dried at 150° C. under a reduced pressure to prepare a positive electrode.

Comparative Example 3

A secondary battery was prepared in a similar way as EXAMPLE 3, but only the preparation of the negative electrode differs from that in EXAMPLE 3.

First, fine natural graphite powder was mixed with 5 weight percent of polyvinylidene fluoride powder, then N-methylpyrrolidone was added to prepare a paste. The resulting paste was coated, dried on the aluminum foil and further dried at 150° C.under a reduced pressure to prepare a negative electrode.

NO hollow structure was observed in scanning electron microscopy of the natural graphite powder.

Other processes were based on EXAMPLE 3.

Table 3 shows summarized results on the evaluation of the lithium secondary batteries made by EXAMPLE 3 and COMPARATIVE EXAMPLE 3. In Table 3, the cycle life, charging/discharging efficiency, i.e., the ratio of the discharged quantity of electricity to the charged quantity of electricity, and energy density per unit volume of the battery (or discharging capacity) are relatively expressed by normalizing the values in EXAMPLE 3 with those in COMPARATIVE EXAMPLE 3.

TABLE 3

| Cycle Life | 1.2 |
| Charging/Discharging Efficiency | 1.2 |
| Energy Density | 1.2 |

Table 3 demonstrates that the secondary lithium battery of EXAMPLE 3 using the porous hollow active material for the negative electrode has a longer cycle life, an increased charging/discharging efficiency, and a higher energy density.

Example 4

A secondary battery shown in FIG. 7 was prepared. In EXAMPLE 4, an active material for the negative electrode, made of a porous hollow carbon based on another process was used, differing from EXAMPLE 3. Preparation of the negative electrode is as follows. (1) Preparation of Negative Electrode After oxidizing a charcoal at 300° C. in air, the charcoal was immersed to etch into an aqueous potassium hydroxide solution, and dried while evacuating. The charcoal was calcined at 2,000° C. in nitrogen gas, then pulverized into carbon powder. After 5 weight percent of polyvinylidene fluoride was mixed into the resulting carbon powder, N-methylpyrrolidone was added to prepare the paste. The negative electrode was made by coating and drying the resulting paste on the copper foil, and by further drying at 150° C. under a reduced pressure.

Many fine pores and hollow cylindrical structure were observed in scanning electron microscopy from the carbon powder obtained by the above process.

Table 4 shows summarized results on the evaluation of the lithium secondary batteries made by EXAMPLE 4 and COMPARATIVE EXAMPLE 3. In Table 4, the cycle life, charging/discharging efficiency, i.e., the ratio of the discharged quantity of electricity to the charged quantity of electricity, and energy density per unit volume of the battery (or discharging capacity) are relatively expressed by normalizing the values in EXAMPLE 4 with those in COMPARATIVE EXAMPLE 3.

TABLE 4

| | |
|---|---|
| Cycle Life | 1.1 |
| Charging/Discharging Efficiency | 1.1 |
| Energy Density | 1.1 |

Table 4 demonstrates that the secondary lithium battery of EXAMPLE 4 using the porous hollow active material for the negative electrode has a longer cycle life, an increased charging/discharging efficiency, and a higher energy density.

Example 5

A secondary battery shown in FIG. 7 was prepared. In EXAMPLE 5, a positive electrode made of a porous hollow active material and a negative electrode made of a porous hollow carbonaceous material were used. Preparations of the positive and negative electrodes are as follows.

(1) Preparation of Negative Electrode

First, 30 g/l of sorbitan monourate and water was added into a polyfurfuryl alcohol in tetrahydrofuran solution, the mixture was emulsified for 1 minute at 3,000 rpm in the emulsifier. The obtained emulsion was dropped into ethanol, the precipitate was dried and calcined to obtain carbon powder at 700° C. in argon gas stream. After 5 weight percent of polyvinylidene fluoride was mixed into the resulting carbon powder, N-methylpyrrolidone was added to prepare the paste. The negative electrode was made by coating and drying the resulting paste on the copper foil, and by further drying at 150° C. under a reduced pressure.

Many fine pores and hollow structure were observed in scanning electron microscopy from the carbon powder obtained by the above process.

Preparation of Positive Electrode

First, a 2M (mol/l) aqueous nickel acetate solution and a 20 g/l hexane solution of a nonionic surfactant (polyoxyethylnesorbitan triolate) were mixed each other by the volume ratio of 1:1, then the mixture was emulsified in the emulsifier for 1 minute at 4,000 rpm. Into the resulting emulsion, 1M of an aqueous lithium citrate solution was gradually dropped to react by spending 30 minutes. After eliminating the oil layer from the resulting solution with the centrifuge, the residue is dried with the spray dryer, calcined to obtain a porous lithium-nickel oxide powder at 650° C. in air.

After 3 weight percent of the carbonaceous part of acetylene black and 5 weight percent of polyvinylidene fluoride powder was mixed into the porous lithium-nickel oxide powder, N-methylpyrrolidone was added to prepare a paste. The resulting paste was coated, dried on the aluminum foil and further dried at 150° C. under a reduced pressure to prepare a positive electrode.

Many fine pores and hollow structure were observed in scanning electron microscopy from the lithium-nickel oxide powder obtained by the above process.

The secondary battery was made based on the process in EXAMPLE 1.

Comparative Example 4

A positive electrode was made by an active material prepared by another process differing from EXAMPLE 5. The same negative electrode as that in COMPARATIVE EXAMPLE 3 was used.

Preparation of Positive Electrode

After mixing nickel carbonate and lithium nitrate by 1:1 molar ratio, the mixture was heated to 650° C. to obtain lithium-nickel oxide. After 3 weight percent of the carbonaceous part of acetylene black and 5 weight percent of polyvinylidene fluoride powder was mixed into the lithium-nickel oxide powder, N-methylpyrrolidone was added to prepare a paste. The resulting paste was coated, dried on the aluminum foil and further dried at 150° C. under a reduced pressure to prepare a positive electrode.

No fine pore and hollow structure were observed in scanning electron microscopy from the lithium-nickel oxide powder obtained by the above process.

Other processes for making the battery were based on EXAMPLE 1.

Table 5 shows summarized results on the evaluation of the lithium secondary batteries made by EXAMPLE 5 and COMPARATIVE EXAMPLE 4. In Table 5, the cycle life, charging/discharging efficiency, i.e., the ratio of the discharged quantity of electricity to the charged quantity of electricity, and energy density per unit volume of the battery (or discharging capacity) are relatively expressed by normalizing the values in EXAMPLE 5 with those in COMPARATIVE EXAMPLE 4, respectively.

TABLE 5

| | |
|---|---|
| Cycle Life | 1.7 |
| Charging/Discharging Efficiency | 1.4 |
| Energy Density | 1.3 |

Table 5 demonstrates that the secondary lithium battery of EXAMPLE 5 using porous hollow active materials for positive and negative electrodes has a longer cycle life, an increased charging/discharging efficiency, and a higher energy density.

Example 6

A secondary battery shown in FIG. 7 was prepared. In EXAMPLE 6, a negative electrode made of porous hollow metallic powder was used. The same positive electrode as COMPARATIVE EXAMPLE 4 was used.

(1) Preparation of Negative Electrode

First, a 3M (mol/l) aqueous copper nitrate solution and a 30 g/l hexane solution of a nonionic surfactant (polyoxyethylnesorbitan triolate) were mixed each other by the volume ratio of 1:2, then the mixture was emulsified in the emulsifier for 1 minute at 4,000 rpm. Into the resulting emulsion, 1M of an aqueous sodium hydroxide solution was gradually dropped to react by spending 30 minutes. After eliminating the oil layer from the resulting solution with the centrifuge and washing with water by decantation, the water layer including the precipitate is dried with the spray dryer, calcined to obtain a porous copper oxide powder at 350° C. in air.

The resulting porous copper oxide powder was reduced to porous hollow copper powder at 400° C. in a hydrogen atmosphere, and then the surface of the copper powder was slightly reoxidized to form the surface coating while introducing trace amount of oxygen.

After 3 weight percent of acetylene black powder and 5 weight percent of polyvinylidene fluoride was mixed into the resulting porous hollow copper powder, N-methylpyrrolidone was added to prepare the paste. The negative electrode was made by coating and drying the resulting paste on the copper foil, and by further drying at 150° C. under a reduced pressure.

Many fine pores and hollow structure were observed in scanning electron microscopy from the copper powder obtained by the above process.

The secondary battery was made based on the process in EXAMPLE 1.

Comparative Example 5

A negative electrode was made by an active material prepared by another process differing from EXAMPLE 6. The same positive electrode as that in COMPARATIVE EXAMPLE 4 was used.

Preparation of Negative Electrode

After 3 weight percent of acetylene black powder and 5 weight percent of polyvinylidene fluoride powder was mixed into the copper powder, N-methylpyrrolidone was added to prepare a paste. The resulting paste was coated, dried on the aluminum foil and further dried at 150° C. under a reduced pressure to prepare a positive electrode. Other processes for making the battery were based on EXAMPLE 1.

Table 6 shows summarized results on the evaluation of the lithium secondary batteries made by EXAMPLE 6 and COMPARATIVE EXAMPLE 5. In Table 6, the cycle life, charging/discharging efficiency, i.e., the ratio of the discharged quantity of electricity to the charged quantity of electricity, and energy density per unit volume of the battery (or discharging capacity) are relatively expressed by normalizing the values in EXAMPLE 6 with those in COMPARATIVE EXAMPLE 5, respectively.

TABLE 6

| Cycle Life | 4.2 |
| Charging/Discharging Efficiency | 3.1 |
| Energy Density | 3.8 |

Table 6 demonstrates that the secondary lithium battery of EXAMPLE 6 using porous hollow negative electrodes has a longer cycle life, an increased charging/discharging efficiency, and a higher energy density.

In EXAMPLES 1 to 6 as described above, lithium-manganese oxide or lithium-nickel oxide was used as the active material for the positive electrode in order to evaluate the characteristics of the negative and positive electrodes. In the present invention, other active materials, such as lithium-cobalt oxide, lithium-vanadium oxide and the like, can also be used for the positive electrode, being limited to EXAMPLES.

Further, although the same electrolyte solution was used in EXAMPLES 1 to 6, any other electrolyte solution can be used without limitation.

Moreover, the shape of the battery is also not limited to EXAMPLES.

While the present invention has been described with reference to what are presently considered to be the preferred embodiments, it is to be understood that the invention is not limited to the disclosed embodiments. To the contrary, the invention is intended to cover various modifications and equivalent arrangements, included within the spirit and scope of the appended claims. The scope of the following claims is to be accorded the broadest interpretation so as to encompass all such modifications and equivalent structures and functions.

Since the positive and negative electrodes each having substantially enhanced specific area can be made according to the present invention, the electrochemical reaction during charging/discharging can be smoothly carried out at a lower current density in the lithium secondary battery utilizing intercalating/deintercalating of the lithium ions. As a result, the secondary battery using lithium, having a longer cycle life, higher charging/discharging efficiency, and higher energy density, can be provided. Further, the secondary battery using lithium having stable characteristics and longer cycle life in which lithium dendrite does not occur or occurs extremely slightly can be provided.

What is claimed is:

1. A secondary battery using lithium comprising at least a negative electrode, a positive electrode, a separator provided between said negative electrode and said positive electrode, and an electrolyte, wherein at least either of said negative electrode or said positive electrode comprises an active material having a porous hollow structure, wherein said porous hollow structure comprises an outer shell surrounding a hollow core section and a plurality of pores each extending completely through said shell to communicate with said hollow core section.

2. A secondary battery using lithium according to claim 1, wherein said active material acts as a host intercalating or deintercalating lithium ions as guests.

3. A secondary battery using lithium according to claim 1, wherein said active material having porous hollow structure for the positive electrode comprises at least a metal oxide.

4. A secondary battery using lithium according to claim 1, wherein said active material having porous hollow structure for said negative electrode or said positive electrode is provided with a conductive material in the hollow core section.

5. A secondary battery using lithium according to claim 1, wherein said active material having porous structure for said negative electrode is selected from the group consisting of a carbonaceous material, metal, metal oxide and a composite material thereof.

6. A secondary battery using lithium according to claim 1, wherein said active material for said negative electrode is a carbonaceous material, and contains at least one element selected from the group consisting of Group IIIB elements, Group IVB elements, Group VB elements, Group VIB elements, and Group VIIB elements in the periodic table of the elements.

7. A secondary battery using lithium according to claim 6, wherein said Group IIIB element contained in said carbonaceous active material for said negative electrode is boron.

8. A secondary battery using lithium according to claim 6, wherein said Group VB element contained in said carbonaceous active material for said negative electrode is at least one element selected from nitrogen and phosphorus.

9. A secondary battery using lithium according to claim 6, wherein said Group IVB element contained in said carbonaceous active material for said negative electrode is silicon.

10. A secondary battery using lithium according to claim 6, wherein said Group VIB element contained in said carbonaceous active material for said negative electrode is at least one element selected from oxygen and sulfur.

11. A secondary battery using lithium according to claim 6, wherein said Group VIIB element contained in said carbonaceous active material for said negative electrode is at least one element selected from fluorine and chlorine.

12. A secondary battery using lithium according to claim 1, wherein said battery further comprises a housing for storing said negative electrode, said positive electrode, said separator, and said electrolyte.

13. A secondary battery using lithium according to claim 1, wherein said negative electrode comprises an active material layer retaining said active material, and a collector.

14. A secondary battery using lithium according to claim 1, wherein said positive electrode comprises an active material layer retaining said active material, and a collector.

* * * * *